United States Patent
McKenna (10) Patent No.: US 11,732,487 B2
(45) Date of Patent: Aug. 22, 2023

(54) MECHANICAL PROXIMITY SENSOR FOR A SLIDABLE EXTENSION OF A WORKER SUPPORT APPARATUS

(71) Applicant: The Boeing Company, Chicago, IL (US)

(72) Inventor: August West McKenna, Everett, WA (US)

(73) Assignee: The Boeing Company, Chicago, IL (US)

( * ) Notice: Subject to any disclaimer, the term of this patent is extended or adjusted under 35 U.S.C. 154(b) by 1012 days.

(21) Appl. No.: 16/443,544

(22) Filed: Jun. 17, 2019

(65) Prior Publication Data

US 2020/0392745 A1    Dec. 17, 2020

(51) Int. Cl.
  *E04G 1/15*  (2006.01)
  *E04G 1/24*  (2006.01)
  *B64F 5/00*  (2017.01)

(52) U.S. Cl.
  CPC ............... *E04G 1/15* (2013.01); *B64F 5/00* (2013.01); *E04G 2001/157* (2013.01); *E04G 2001/242* (2013.01)

(58) Field of Classification Search
  CPC ....... E04G 1/15; E04G 2001/157; E04G 3/30; E04G 3/305; E04G 3/325; B63B 27/141; B66F 17/00; B66F 17/006; B64F 1/305; B64F 5/10; B64F 5/40; B64F 5/60
  See application file for complete search history.

(56) References Cited

U.S. PATENT DOCUMENTS

| | | | | |
|---|---|---|---|---|
| 3,687,321 A | * | 8/1972 | Goodhart | B64F 1/32 182/69.5 |
| 3,931,868 A | * | 1/1976 | Smith, Jr. | A62B 1/02 244/137.1 |
| 4,011,615 A | * | 3/1977 | Maxson | B63B 27/14 14/71.1 |
| 4,124,130 A | * | 11/1978 | Rohrs | A61G 3/062 187/217 |
| 4,188,000 A | * | 2/1980 | Dalziel | B64D 1/22 182/138 |
| 4,366,591 A | * | 1/1983 | Zimmerman | B63B 27/14 182/2.11 |
| 4,442,921 A | * | 4/1984 | Sherman | A61G 3/061 187/217 |

(Continued)

FOREIGN PATENT DOCUMENTS

GB    2494379 A  *  3/2013  ............ E04G 1/15

*Primary Examiner* — Colleen M Chavchavadze
(74) *Attorney, Agent, or Firm* — Kolisch Hartwell, P.C.

(57) ABSTRACT

Apparatus, devices, and methods relating to a mechanical proximity sensor for a slidable extension. An illustrative apparatus may comprise an elevated platform and an extension slidably extendable from the elevated platform toward a workpiece. The apparatus also may comprise a probe coupled movably to the extension. The apparatus further may comprise an indicator connected to the probe and configured to rotate from a first orientation to a second orientation in response to engagement between the probe and the workpiece as the extension approaches the workpiece. The indicator may be configured to complete rotation from the first orientation to the second orientation when a leading edge of the extension is located at a predetermined distance from the workpiece.

20 Claims, 5 Drawing Sheets

(56) References Cited

U.S. PATENT DOCUMENTS

| | | | | |
|---|---|---|---|---|
| 5,865,593 A * | 2/1999 | Cohn | ...................... | A61G 3/062 |
| | | | | 414/545 |
| 9,228,364 B1 * | 1/2016 | Dubose | .................. | B23Q 3/062 |
| 9,441,382 B2 * | 9/2016 | Hokanson | ............... | E06C 7/182 |
| 10,094,509 B2 * | 10/2018 | So | .......................... | F16M 13/00 |
| 10,167,001 B2 * | 1/2019 | Kondyra | ................ | B61D 47/00 |
| 11,008,074 B2 * | 5/2021 | Robertson | ............. | B63B 27/143 |
| 2011/0073409 A1 * | 3/2011 | Ricci | ........................ | E04G 1/36 |
| | | | | 182/62.5 |

* cited by examiner

MECHANICAL PROXIMITY SENSOR FOR A SLIDABLE EXTENSION OF A WORKER SUPPORT APPARATUS

FIELD

The present disclosure relates to apparatus and methods for supporting a worker adjacent a workpiece. More specifically, the disclosed examples relate to apparatus, devices, and methods for positioning a slidable extension of a worker support apparatus in close proximity to the workpiece.

INTRODUCTION

Aircraft are often constructed, serviced, and repaired by workers supported by an elevated platform adjacent the aircraft. Due to the contours of an aircraft, there are inevitable gaps between the elevated platform and the aircraft. Extensions that slidably deploy from the elevated platform are utilized to close the gaps by positioning a leading edge of each extension in close proximity to the aircraft. However, it can be difficult for an observer to safely and precisely determine the distance between the leading edge and a surface of the aircraft as the extension is being extended. Accordingly, the extension may be advanced inadvertently into damaging contact with the aircraft.

New apparatus, devices, and methods are needed to safely and reliably position the leading edge of an extension in close proximity to an aircraft (or other workpiece) without contacting the workpiece with the extension.

SUMMARY

The present disclosure provides apparatus, devices, and methods relating to a mechanical proximity sensor for a slidable extension of a support apparatus. In some examples, an apparatus may comprise an elevated platform and an extension slidably extendable from the elevated platform toward a workpiece. The apparatus also may comprise a probe coupled movably to the extension. The apparatus further may comprise an indicator connected to the probe and configured to rotate from a first orientation to a second orientation in response to engagement between the probe and the workpiece as the extension approaches the workpiece. The indicator may be configured to complete rotation from the first orientation to the second orientation when a leading edge of the extension is located at a predetermined distance from the workpiece. In some examples, the device may comprise a base configured to be mounted at an end of an extension body such that the base and the extension body collectively form an extension that is slidably extendable from an elevated platform. A probe may be coupled to the base, and an indicator may be connected to the probe and configured as described above. In some examples, the method may comprise sliding an extension from an elevated platform to move a leading edge of the extension, and a probe and an indicator carried by the extension, toward a workpiece. The method also may comprise creating engagement between the probe and the workpiece by further sliding the extension from the elevated platform, and rotating the indicator from a first orientation to a second orientation in response to creating engagement. The indicator may complete rotation from the first orientation to the second orientation when the leading edge of the extension is located at a predetermined distance from the workpiece.

Features, functions, and advantages may be achieved independently in various examples of the present disclosure, or may be combined in yet other examples, further details of which can be seen with reference to the following description and drawings.

DETAILED DESCRIPTION

Various aspects and examples of apparatus, devices, and methods including or utilizing a mechanical proximity sensor are described below and illustrated in the associated drawings. Unless specified otherwise, an apparatus, device or method in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present disclosure may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

The term "exemplary" as used in the present disclosure, means illustrative or serving as an example. Similarly, the term "exemplify" means to illustrate by giving an example. Neither term implies desirability nor superiority.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into Subsections A to C, each of which is labeled accordingly.

Overview

In general, the present disclosure provides apparatus, devices, and methods relating to a mechanical proximity sensor for a slidable extension. The proximity sensor may undergo a visible change in configuration when a leading edge of the extension is in close proximity to a workpiece, and, optionally, the change in configuration may create a toeboard at the leading edge of the extension.

In some examples, the apparatus may comprise an elevated platform to support one or more workers and an extension slidably extendable from the elevated platform toward a workpiece. The apparatus also may comprise a probe coupled movably to the extension. For example, the probe may slide relative to the extension along an axis that is parallel to an axis along which the extension slidably extends. The apparatus further may comprise an indicator connected to the probe and configured to rotate from a first orientation to a second orientation in response to engagement between the probe and the workpiece as the extension approaches the workpiece. Connection to the probe may be via a mechanical linkage including a cable guided by a pulley and arranged in series with a tension spring. The indicator may be configured to complete rotation from the first orientation to the second orientation when a leading edge of the extension is located at a predetermined distance from the workpiece. The predetermined distance may place the leading edge of the extension in close proximity to the workpiece, such as within about one to three inches from the workpiece, among others. The indicator also may form a vertical wall above the extension in the second orientation. The vertical wall may be structured as a toeboard that presents a barrier to distal movement of tools and/or a worker's shoes past the leading edge of the extension, thereby making the extension safer.

In some examples, the device may comprise a base configured to be mounted at an edge of an extension body such that the base and the extension body collectively form an extension that is slidably extendable from an elevated platform. A probe may be coupled to the base, and an indicator may be connected to the probe. Both the probe and the indicator may be supported by the base and connected to the extension body via the base. The probe and the indicator further may be configured as described above. The base may be an end cap that substantially covers a distal end of the extension body and provides a distal section of the extension. The device may be configured for retrofitting existing support apparatus including an elevated platform and slidable extensions.

In some examples, the method may comprise sliding an extension from an elevated platform to move a leading edge of the extension, and a probe and an indicator carried by the extension, toward a workpiece. The method also may comprise creating engagement between the probe and the workpiece by further sliding the extension from the elevated platform, and rotating the indicator from a first orientation to a second orientation in response to creating engagement. The indicator may complete rotation from the first orientation to the second orientation when the leading edge of the extension is located at a predetermined distance from the workpiece.

Features, functions, and advantages may be achieved independently in various examples of the present disclosure, or may be combined in yet other examples, further details of which can be seen with reference to the following description and drawings.

Examples, Components, and Alternatives

The following subsections describe selected aspects of exemplary proximity sensors as well as related apparatus and methods. The examples in these subsections are intended for illustration and should not be interpreted as limiting the entire scope of the present disclosure. Each subsection may include one or more distinct examples, and/or contextual or related information, function, and/or structure.

A. Illustrative Worker Support Apparatus

Figure 1:
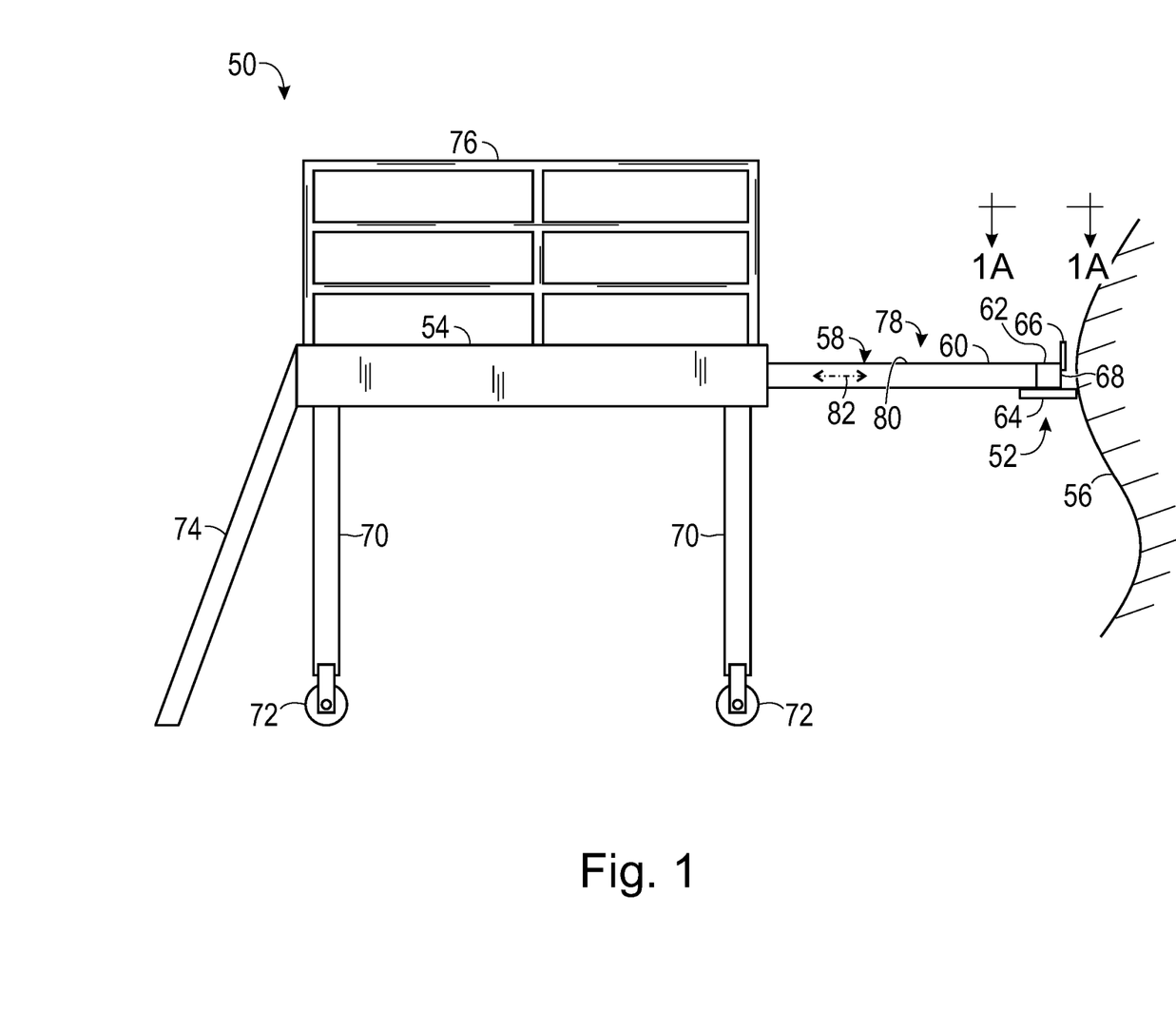
FIG. 1 is a schematic side view of an illustrative worker support apparatus including an elevated platform, a slidable extension, and a mechanical proximity sensor including a probe and an indicator supported by the extension adjacent a workpiece (shown as fragmentary), in accordance with aspects of the present disclosure.
Figure 1A:
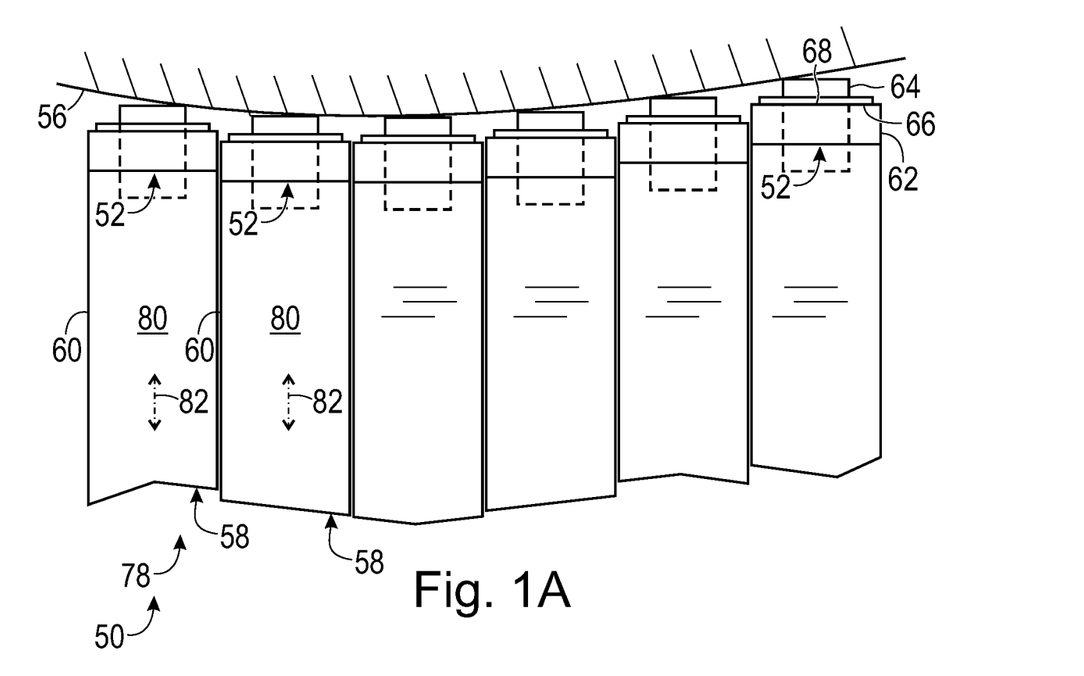
FIG. 1A is a fragmentary top view of the support apparatus of FIG. 1, taken generally along line 1A-1A of FIG. 1, toward a distal portion of the extension, and showing a series of laterally arranged extensions of the support apparatus forming a deck and each supporting a mechanical proximity sensor.
Figure 2:
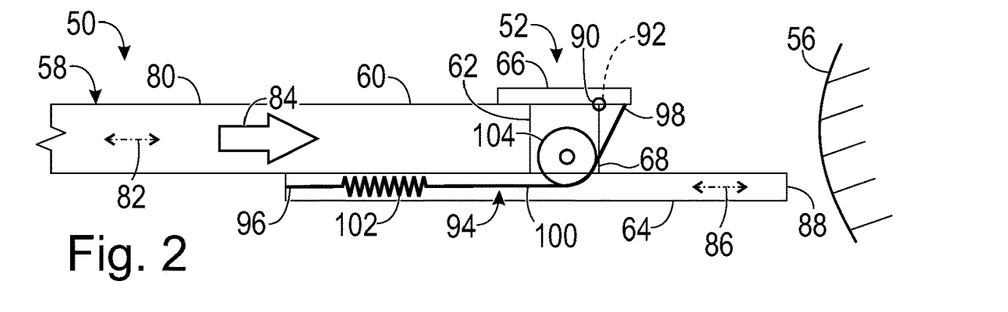
FIGS. 2-7 are a series of schematic, fragmentary side views of the extension and proximity sensor of FIG. 1 located adjacent the workpiece, with the views illustrating operation of the proximity sensor as the extension is progressively advanced into close proximity to the workpiece (FIGS. 2-5) and then retracted (FIGS. 6 and 7).

This subsection describes an illustrative worker support apparatus 50 including an illustrative mechanical proximity sensor 52; see FIGS. 1, 1A, and 2. Support apparatus 50, proximity sensor 52, and methods using the support apparatus and proximity sensor, as described in this subsection, are examples of apparatus, devices, and methods described above.

FIG. 1 shows a side view of worker support apparatus 50, which has an elevated platform 54 to support one or more workers adjacent a workpiece 56. An extension 58 of support apparatus 50 is slidably deployable from elevated platform 54 toward workpiece 56, to allow one or more workers to access the workpiece.

Proximity sensor 52 is mounted to a distal portion of an extension body 60 of extension 58, and may include a base 62, a probe 64, and an indicator 66 (see FIGS. 1 and 2). Base 62 may be considered to be part of extension 58 to provide a leading edge 68 thereof. As extension 58 approaches workpiece 56, probe 64 first touches and then presses against workpiece 56, which actuates rotation of indicator 66 (also see Subsection B). This rotation changes the orientation of indicator 66, to visibly signal when leading edge 68 is sufficiently close to workpiece 56 such that advancement of extension 58 should be stopped. Accordingly, the use of proximity sensor 52 can avoid under-advancement of extension 58, which may provide an unsafe working condition, and also can avoid over-advancement of extension 58, which may damage workpiece 56.

The terms "proximal" and "distal" as used herein are relative terms respectively meaning closer to or towards elevated platform 54 (proximal) and closer to or towards workpiece 56 (distal). The terms "trailing" and "leading" as used herein are descriptive terms that are generally synonymous with "proximal" and "distal," respectively.

Support apparatus 50 may have any suitable additional components and features. Elevated platform 54 may be supported at any suitable height above the ground or floor by a plurality of legs 70 and/or other support structure. The height may be adjustable (e.g., by a lift mechanism, such as a scissor lift) or may be non-adjustable. Onboard wheels 72, rollers, or similar structure may confer horizontal mobility to support apparatus 50, or support apparatus 50 may be moved with a vehicle (e.g., a fork lift) or manually by dis-assembly and re-assembly. A ladder 74, stairs, or an elevator, among others, may allow workers to reach elevated platform 54. A guard rail structure 76 may extend along the perimeter of elevated platform 54 to minimize the risk of a fall. Similar fall-protection structure also may be associated with extension 58, to prevent a worker from falling off a side of the extension, but is not illustrated here to simplify the presentation.

Support apparatus 50 has a deployable deck 78 next to elevated platform 54 (see FIGS. 1 and 1A). Deck 78 can be formed by a plurality of extensions 58 arranged parallel and laterally to one another, as shown in FIG. 1A. Each extension 58 may support a respective proximity sensor 52 at a distal portion thereof. Top surfaces 80 of extensions 58 may be substantially coplanar to one another. Extensions 58 may be slidable from elevated platform 54 along parallel sliding axes 82, optionally independently of one another. Accordingly, the number of extensions 58 deployed, and the distance each is deployed, determines the size and shape of deck 78. The ability to deploy extensions 58 to different lengths permits deck 78 to be custom-shaped to roughly follow an uneven/varying horizontal contour that may be present on workpiece 56 at the elevation of deck 78. Travel of each extension 58 along its extension sliding axis 82 may be powered manually or with a motor, among others.

Each extension 58 may have any suitable size and shape. The extension may (or may not) be elongated parallel to axis 82 to produce any suitable maximum deployed length. For example, the maximum deployed length may be at least about 1, 2, or 3 feet, among others. The width of each extension 58 measured horizontally in a direction orthogonal to axis 82 may, for example, be at least about 8, 10, or 12 inches, and/or less than about 30, 24, or 20 inches, among others. The thickness of each extension 58, measured vertically, may be significantly less than the width of the extension, such as less than about 50%, 25%, or 10% of the width.

Each extension 58 may be slidably supported under elevated platform 54 or at least partially housed within the elevated platform. In either case, extension 58 is described as being slidable and deployable from elevated platform 54.

Workpiece 56 may be any suitable object, assembly of objects, and/or structure upon which work of any kind is to be performed. The workpiece is typically taller than the elevation of elevated platform 54, and may have an uneven/contoured surface or envelope in a vertical plane and/or horizontal plane. An illustrative workpiece 56 is an aircraft (or part thereof) being constructed, serviced, repaired, or modified.

B. Illustrative Structure, Operation, and Use of a Mechanical Proximity Sensor

This subsection describes further aspects of the structure and operation of proximity sensor 52 introduced above in Subsection A; see FIGS. 2-7. Accordingly, illustrative steps of a method are described in this subsection but are not intended to limit the combination of steps of the method or the possible ways of carrying out any particular step of the method.

FIG. 2 shows extension 58 being extended by sliding travel, represented by an arrow at 84, along axis 82 toward workpiece 56. Proximity sensor 52 is being carried toward workpiece 56 by extension 58, which includes extension body 60 and base 62, which is mounted to an edge portion of extension body 60.

Probe 64 may be movably coupled to extension 58 at base 62. For example, probe 64 may be slidably coupled to, and supported by, base 62 for translational motion along a probe sliding axis 86 that is parallel to extension sliding axis 82. Probe 64 has a leading edge 88 that is the most distal aspect of proximity sensor 52, such that probe 64 is closest to, and positioned for contact with, workpiece 56. The probe may be located under, or housed partially in, extension 58.

Indicator 66 may be pivotably coupled to extension 58 at base 62. For example, indicator 66 may be coupled to an upper portion of base 62 via a hinge 90. The indicator may be rotatable by one-fourth turn between a horizontal orientation, shown in FIG. 2, and a vertical orientation, shown in FIGS. 4 and 5. A biasing element 92, such as a torsion spring, may bias indicator 66 toward the horizontal orientation. In other examples, base 62 may be eliminated, and probe 64 and indicator 66 may be coupled to extension body 60 directly.

A mechanical linkage 94 couples translational motion of probe 64 and rotational motion of indicator 66 to one another. Accordingly, mechanical linkage 94 may be connected at one end to probe 64 via a proximal connection 96, and at the other end to indicator 66 via a distal connection 98. Distal connection 98 is spaced from the rotation axis of hinge 90, such that tension applied to mechanical linkage 94 at proximal connection 96 creates torque via distal connection 98 to rotate indicator 66 via hinge 90.

Mechanical linkage 94 may include a cable 100 and a spring 102 (e.g., a tension spring) connected in series. Spring 102 may be stronger than biasing element 92, as explained further below. A pulley 104 may be rotatably mounted to extension 58 at base 62, and operatively engaged with cable 100, which allows mechanical linkage 94 to move and transmit force between proximal and distal connections 96, 98 along a non-linear path. The rotation axis of pulley 104 may be parallel to the rotation axis of hinge 90, and/or horizontal and orthogonal to a line that is parallel to extension sliding axis 82.

Figure 3:
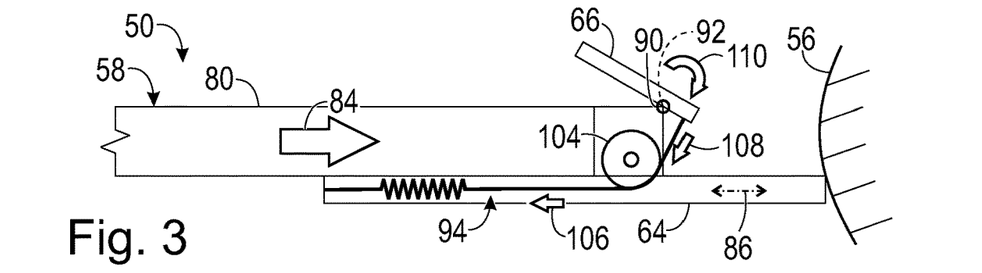
Figure 4:
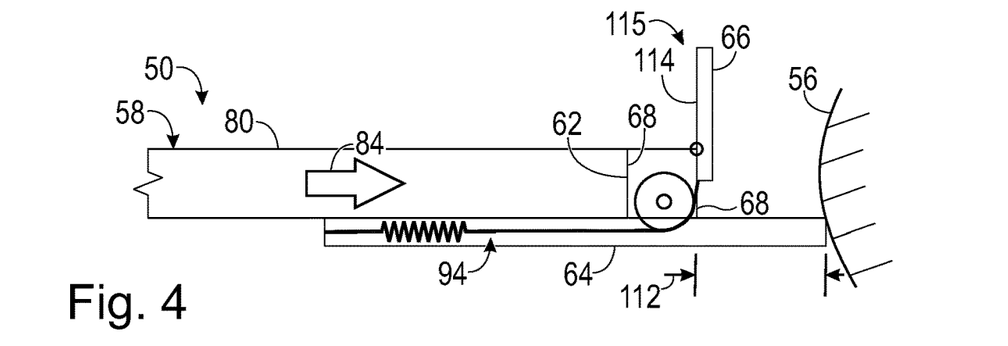
Figure 5:
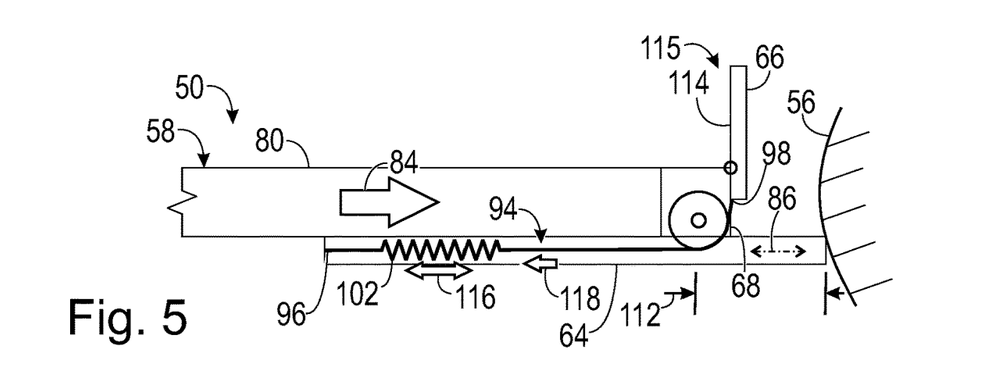

FIGS. 2-5 show proximity sensor 52 in four configurations produced by sliding travel 84 of extension 58 progressively closer to workpiece 56. In FIG. 2, probe 64 has not yet contacted workpiece 56. Accordingly, proximity sensor 52 is arranged in its resting or default configuration, with indicator 66 maintained in a horizontal orientation by biasing element 92. In FIGS. 3-5, probe 64 and workpiece 56 are engaged with one another as extension 58 advances toward workpiece 56. Advancement of probe 64 is stopped by workpiece 56, so probe 64 remains stationary with respect to workpiece 56. However, probe 64 does not apply damaging pressure to workpiece 56, because probe 64 can move with respect to workpiece 56, as explained below.

FIG. 3 shows workpiece 56 applying a proximally-directed force on probe 64. This force drives, with respect to workpiece 56, (i) axial travel of probe 64 and an axial portion of mechanical linkage 94, represented by an arrow at 106, (ii) oblique travel of a distal portion of mechanical linkage 94 toward/past pulley 104, represented by an arrow at 108, and (iii) rotation of indicator 66 from its biased horizontal orientation, represented by an arrow at 110. Stated differently, force applied to probe 64 by workpiece 56 results in torque on indicator 66 sufficient to overcome the biasing effect of biasing element 92.

FIG. 4 shows indicator 66 at the moment it has arrived at a vertical orientation. The vertical orientation indicates that extension 58 has approached workpiece 56 sufficiently, to a safe proximity, and distal sliding travel 84 of extension should be stopped. Leading edge 68 is now located at a predetermined distance 112 from workpiece 56, such as no more than about 4, 3, or 2 inches, among others, from the workpiece.

Further rotation of indicator 66 past vertical may be prevented by contact between indicator 66 and leading edge 68 of extension 58. Indicator 66 may form a vertical wall 114 extending upward from extension 58 at leading edge 68. The height of vertical wall 114 may be at least about 1, 2, or 3 inches, among others. Vertical wall 114 may form a toeboard 115 at leading edge 68 that serves as a barrier to reduce the risk of items, such as tools, being inadvertently knocked off extension 58, and to keep a worker's shoes proximal to leading edge 68 of extension 58.

FIG. 5 shows the result of further sliding travel 84 of extension 58 toward workpiece 56. Leading edge 68 has moved closer than predetermined distance 112 to workpiece 56 (compare with FIG. 4). Distal connection 98 of mechanical linkage 94 can move closer to workpiece 56 as spring 102 stretches, represented by a double-headed arrow at 116. Stretching spring 102 increases the path length of mechanical linkage 94 between proximal and distal connections 96, 98. As a result, probe 64 travels along probe sliding axis 86 relative to extension 58, represented by a motion arrow at 118. Spring 102 reduces the risk of damaging workpiece 56 with probe 64 when sliding travel 84 of extension 58 continues after indicator 66 has reached the vertical orientation. As spring 102 stretches, it increasingly resists further sliding travel 84 of extension 58 toward workpiece 56, which may provide an additional indication that sliding travel 84 should be stopped.

Figure 6:
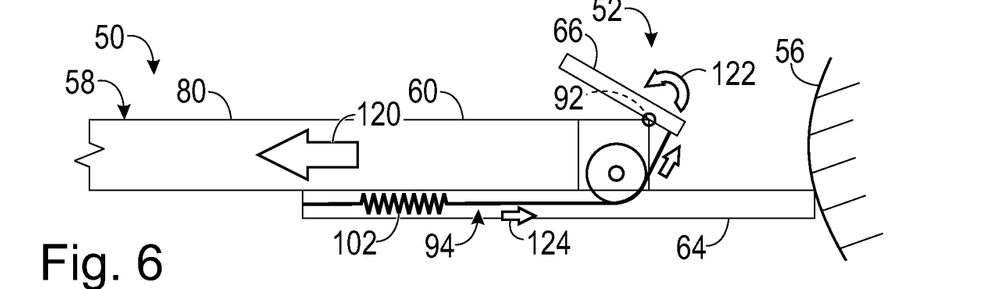
Figure 7:
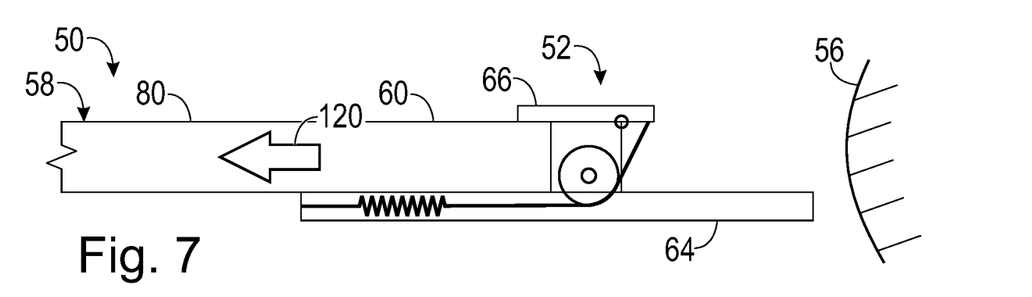

FIGS. 6 and 7 illustrate configurations of proximity sensor 52 produced by sliding travel of extension 58 proximally, represented by a motion arrow at 120. Starting from the configuration of FIG. 5, the configurations of FIGS. 2-4 are produced in reverse order, with each of the motion arrows reversed. First, since spring 102 is stronger than biasing element 92, spring 102 contracts and probe 64 travels axially with respect to extension 58, while indicator 66 remains in the vertical orientation. Next, once spring 102 is contracted, biasing element 92 drives rotation of indicator 66, represented by a rotation arrow at 122, back to the horizontal orientation. At the same time, probe 64 and a proximal portion of mechanical linkage 94 travel axially with respect to extension 58, represented by a motion arrow at 124 (see FIG. 6). Once indicator 66 has returned to the horizontal orientation, probe 64 separates from workpiece 56 as a result of proximal travel 120 of extension 58 (see FIG. 7).

C. Further Illustrative Structure of a Device With a Mechanical Proximity Sensor This subsection describes further illustrative structural aspects and features of an example of proximity sensor 52 described above in Subsections A and B; see FIG. 8.

Figure 8:
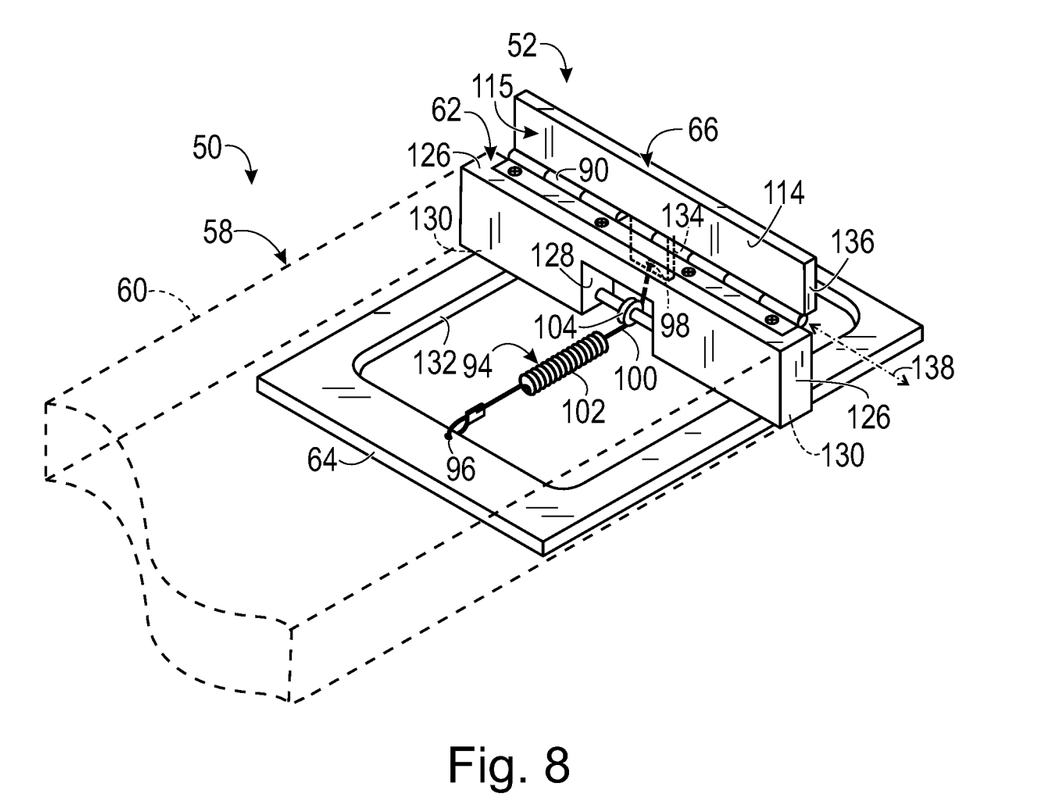
FIG. 8 is a fragmentary, isometric view of an illustrative example of the extension and proximity sensor of FIG. 1, taken around a distal portion of the extension, with an extension body of the extension shown dashed.

FIG. 8 shows proximity sensor 52 in solid lines, and extension body 60 of extension 58 in dashed lines. Base 62 may be structured as an end cap 126 that mounts to a distal edge of extension body 60 to form a short edge section of extension 58. End cap 126 may have dimensions that substantially match the width and thickness of extension body 60, as shown. Pulley 104 of mechanical linkage 94 may be rotatably mounted in a recess 128 defined by end cap 126.

Probe 64 may be slidably coupled to end cap 126 via tracks 130 mounted under the end cap. The probe may define an opening 132 extending between top and bottom surfaces thereof. A portion of mechanical linkage 94 near proximal connection 96, such as spring 102, may be located in opening 132. The opening may make probe 64 lighter and easier to slide, and less likely to damage a workpiece.

Indicator 66 may be mounted to a top side of end cap 126 via a spring-loaded hinge 90. Indicator 66 is shown in a vertical orientation, which can be produced as described above in Subsection B. Indicator 66 may have a lever 134 at which mechanical linkage 94 forms distal connection 98 with the indicator. Lever 134 may project downward when a flag portion 136 of indicator 66 is in a vertical orientation. Flag portion 136 also may form a vertical wall 114 that can function as a toeboard 115.

The distance between distal connection 98 and a rotation axis 138 about which indicator 66 rotates may determine how far leading edge 68 travels as indicator 66 rotates from the horizontal orientation to the vertical orientation. Placing distal connection 98 closer to, or farther from, rotation axis 138 respectively decreases or increases the travel distance for leading edge 68. A longer travel distance may be advantageous to provide earlier notice that advancement of extension 58 needs to be slowed or stopped.

Illustrative Combinations and Additional Examples

This section describes additional aspects and features of apparatus, devices, and methods including or utilizing a mechanical proximity sensor for a slidable extension of an elevated work support platform, presented without limitation as a series of paragraphs, some or all of which may be alphanumerically indexed for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

Paragraph A1. An apparatus, comprising: (i) an elevated platform; (ii) an extension slidably extendable from the elevated platform toward a workpiece; (iii) a probe coupled movably to the extension; and (iv) an indicator connected to the probe and configured to rotate from a first orientation to a second orientation in response to engagement between the probe and the workpiece as the extension approaches the workpiece; wherein the indicator is configured to complete rotation from the first orientation to the second orientation when a leading edge of the extension is located at a predetermined distance from the workpiece.

Paragraph A2. The apparatus of paragraph A1, further comprising a mechanical linkage connecting the indicator to the probe and configured to couple (a) movement of the probe and the extension relative to one another to (b) rotation of the indicator between the first orientation and the second orientation.

Paragraph A3. The apparatus of paragraph A1 or A2, wherein the extension is slidably extendable toward the workpiece along an axis, and wherein the probe and the extension are configured to move relative to one another parallel to the axis in response to the engagement between the probe and the workpiece.

Paragraph A4. The apparatus of paragraph A2 or A3, wherein the mechanical linkage includes a cable.

Paragraph A5. The apparatus of any of paragraphs A2 to A4, wherein the mechanical linkage includes a spring configured to stretch if the leading edge of the extension moves closer to the workpiece than the predetermined distance while the probe and the workpiece are engaged with one another.

Paragraph A6. The apparatus of any of paragraphs A1 to A5, wherein the indicator is biased toward the first orientation by a biasing element.

Paragraph A7. The apparatus of paragraph A6, wherein the biasing element includes a torsion spring.

Paragraph A8. The apparatus of any of paragraphs A1 to A7, wherein the predetermined distance is between about one inch and three inches.

Paragraph A9. The apparatus of any of paragraphs A1 to A8, wherein the indicator in the second orientation is configured to form a vertical wall extending upward from the leading edge of the extension.

Paragraph A10. The apparatus of paragraph A9, wherein a top surface of the extension defines a plane, and wherein the vertical wall has a height of at least about 2 inches above the plane.

Paragraph A11. The apparatus of any of paragraphs A1 to A10, wherein the extension has a width, and wherein the indicator extends along more than one-half of the width adjacent the leading edge.

Paragraph A12. The apparatus of any of paragraphs A1 to A11, wherein the indicator in the second orientation is configured to form a toeboard that prevents a worker's shoes from sliding distally off a top surface of the extension via the leading edge.

Paragraph A13. The apparatus of any of paragraphs A1 to A12, further comprising a discrete device mounted to a distal edge of an elongated extension body, and wherein the discrete device includes the probe, the indicator, and a distal section of the extension including the leading edge.

Paragraph B1. A device for sensing proximity mechanically, the device comprising: (i) a base configured to be mounted at an end of an extension body such that the base and the extension body collectively form an extension that is slidably extendable from an elevated platform; (ii) a probe coupled to the base; and (iii) an indicator connected to the probe and configured to rotate from a first orientation to a second orientation in response to engagement between the probe and a workpiece as the extension is slidably extended toward the workpiece; wherein the indicator is configured to complete rotation from the first orientation to the second orientation when a leading edge of the extension is located at a predetermined distance from the workpiece.

Paragraph B2. The device of paragraph B1, wherein the probe is slidably supported by the base for travel of the probe relative to the base parallel to an axis along which the extension is extendable.

Paragraph B3. The device of paragraph B1 or B2, wherein the indicator is connected to the probe via a mechanical linkage including a spring, and wherein the spring is configured to stretch if the leading edge of the extension moves closer to the workpiece than the predetermined distance while the probe and the workpiece are engaged with one another.

Paragraph B4. The device of any of paragraphs B1 to B3, wherein the indicator is biased toward the first orientation by a biasing element.

Paragraph B5. The device of any of paragraphs B1 to B4, wherein the indicator is configured to form a vertical wall in the second orientation, and wherein the vertical wall extends upward from the base.

Paragraph B6. The device of any of paragraphs B1 to B5, further comprising any limitation or combination of limitations from paragraphs A1 to A13 and C1 to C5.

Paragraph C1. A method, comprising: (i) sliding an extension from an elevated platform to move a leading edge of the extension, and a probe and an indicator carried by the extension, toward a workpiece; (ii) creating engagement between the probe and the workpiece by further sliding the extension from the elevated platform; and (iii) rotating the indicator from a first orientation to a second orientation in response to creating engagement, wherein the indicator completes rotation from the first orientation to the second orientation when the leading edge of the extension is located at a predetermined distance from the workpiece.

Paragraph C2. The method of paragraph C1, wherein creating engagement includes forming a vertical wall above the leading edge of the extension using the indicator in the second orientation, and wherein, optionally, the vertical wall has any combination of the features disclosed elsewhere herein.

Paragraph C3. The method of paragraph C1 or C2, wherein the indicator is connected to the probe via a mechanical linkage including a spring, further comprising stretching the spring by moving the leading edge of the extension closer to the workpiece than the predetermined distance while the probe is engaged with the workpiece.

Paragraph C4. The method of any of paragraphs C1 to C3, further comprising retracting the extension to eliminate engagement between the probe and the workpiece, wherein the indicator is biased toward the first orientation and rotates from the second orientation to the first orientation as the engagement is eliminated.

Paragraph C5. The method of any of paragraphs C1 to C4, wherein rotating includes forming a toeboard above the leading edge of the extension.

Paragraph C6. The method of any of paragraphs C1 to C5, further comprising any limitation or combination of limitations from paragraphs A1 to A13 and B1 to B5.

Advantages, Features, and Benefits

The different examples of the systems, apparatus, and methods including or utilizing a mechanical proximity sensor as described herein provide several advantages over known solutions for sensing the proximity of a slidably deployed extension to a workpiece. For example, illustrative examples described herein allow the proximity sensor to function without associated electronic circuitry and without a source of electrical power. Additionally, and among other benefits, illustrative examples described herein allow an indicator of the proximity sensor to form a vertical wall above a leading edge of the extension, which may provide a toeboard to increase safety for workers on and under the extension. Accordingly, the proximity sensor can perform two functions at the same time, for improved efficiency. Furthermore, among other benefits, illustrative examples described herein allow an extension body to be retrofitted with a proximity sensor device by mounting a base of the device at a distal edge of an extension body to collectively form a slidably deployable extension. No known apparatus or device can perform these functions, particularly when the workpiece has a varying horizontal/vertical contour. Thus, the illustrative examples described herein are particularly useful for constructing, servicing, repairing, and/or modifying aircraft or parts thereof. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. An apparatus, comprising:
an elevated platform and a ladder or stair set configured for accessing the platform from the ground;

an extension having a leading edge slidably extendable horizontally from the elevated platform toward a side surface of an aircraft;

a probe extending horizontally from the leading edge of the extension and being slidably coupled to the extension; and an indicator connected to the probe and configured to rotate from a first orientation to a second orientation in response to engagement between the probe and the side surface as the extension approaches the side surface;

wherein the indicator is configured to complete rotation from the first orientation to the second orientation when the leading edge of the extension is located at a predetermined distance from the side surface of the aircraft; and wherein the indicator in the second orientation is configured to form a vertical wall extending upward from the leading edge of the extension.

2. The apparatus of claim 1, further comprising a mechanical linkage connecting the indicator to the probe and configured to couple (i) movement of the probe and the extension relative to one another to (ii) rotation of the indicator between the first orientation and the second orientation.

3. The apparatus of claim 2, wherein the extension is slidably extendable toward the side surface of the aircraft along an axis, and wherein the probe and the extension are configured to move relative to one another parallel to the axis in response to the engagement between the probe and the side surface of the aircraft.

4. The apparatus of claim 2, wherein the mechanical linkage includes a cable.

5. The apparatus of claim 2, wherein the mechanical linkage includes a spring configured to stretch if the leading edge of the extension moves closer to the side surface of the aircraft than the predetermined distance while the probe and the side surface of the aircraft are engaged with one another.

6. The apparatus of claim 1, wherein the indicator is biased toward the first orientation by a biasing element.

7. The apparatus of claim 6, wherein the biasing element includes a torsion spring.

8. The apparatus of claim 1, wherein the predetermined distance is between about one inch and three inches.

9. The apparatus of claim 1, wherein a top surface of the extension defines a plane, and wherein the vertical wall has a height of at least about 2 inches above the plane.

10. The apparatus of claim 1, wherein the extension has a width, and wherein the indicator extends along more than one-half of the width adjacent the leading edge.

11. The apparatus of claim 1, wherein a height of the elevated platform is adjustable by a lift mechanism.

12. The apparatus of claim 1, wherein the elevated platform is supported by a plurality of legs, the plurality of legs being adjustable in height.

13. The apparatus of claim 1, wherein the probe and the indicator are connected by a cable and a coil spring.

14. The apparatus of claim 1, wherein the indicator is in a horizontal position, aligned parallel to the extension, while in the first position, and perpendicular to the extension when in the second position.

15. The apparatus of claim 1, wherein the extension is a first extension, and further comprising: a second extension adjacent to the first extension, the second extension having a separate probe for adjusting the second extension to a different extent than the first extension, to accommodate a nonlinear external profile of an airplane.

16. An apparatus, comprising:
an elevated platform having an adjustable height;
an extension having an underside and a leading edge slidably extendable horizontally from the elevated platform toward a side surface of an aircraft;
a probe extending horizontally from the leading edge of the extension and being slidable rearward along the underside of the extension when the probe engages the side surface of the aircraft; and
an indicator connected to the probe and configured to rotate from a first orientation to a second orientation as the probe slides along the underside of the extension in response to engagement between the probe and the side surface of the aircraft as the extension approaches the side surface of the aircraft;
wherein the indicator is configured to complete rotation from the first orientation to the second orientation when a leading edge of the extension is located at a predetermined distance from the side surface of the aircraft.

17. The apparatus of claim 16, wherein the probe is slidably supported by a base for travel of the probe relative to the base parallel to an axis along which the extension is extendable.

18. The apparatus of claim 16, wherein the indicator is connected to the probe via a mechanical linkage including a spring, and wherein the spring is configured to stretch if the leading edge of the extension moves closer to the workpiece than the predetermined distance while the probe and the workpiece are engaged with one another.

19. The apparatus of claim 16, wherein the indicator is configured to form a vertical wall in the second orientation, and wherein the vertical wall extends upward from the base.

20. The apparatus of claim 16, wherein the indicator, while in the first position is parallel to the extension and while in the second position is perpendicular to the extension.

* * * * *